April 26, 1966
T. J. LORD
3,248,055
THERMOSTATIC MIXING VALVE
Filed Jan. 10, 1964
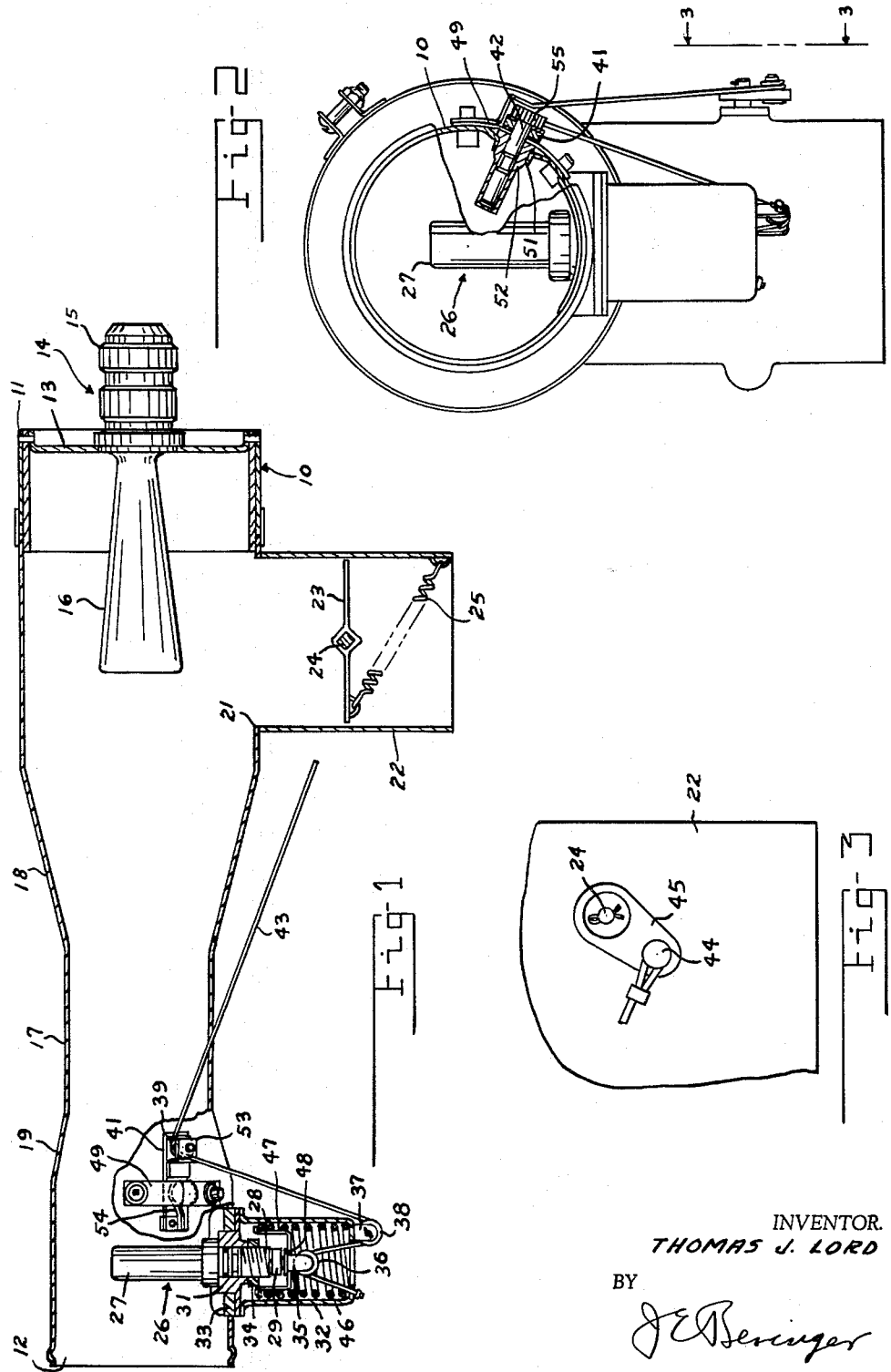
INVENTOR.
THOMAS J. LORD
BY

United States Patent Office 3,248,055
Patented Apr. 26, 1966

3,248,055
THERMOSTATIC MIXING VALVE
Thomas J. Lord, Middletown, Ohio, assignor to United Aircraft Products, Inc., Dayton, Ohio, a corporation of Ohio
Filed Jan. 10, 1964, Ser. No. 336,976
5 Claims. (Cl. 236—13)

This invention relates to mixing valves as used, for example, in cabin heating systems of aircraft and the like.

An object of the invention, in a device as described, is to achieve a tempering effect upon a stream of flowing high temperature air and to maintain the temperature of the tempered air flow at or about a selected value.

Another object of the invention is to provide a mixing valve as described especially characterized by an arrangement for aspirating variable quantities of a tempering air as determined by the temperature of the air mixture.

A further object of the invention is to embody a mixing valve as described in a unitary structure in which a duct for flowing and mixing the air incorporates in itself a means for aspirating a tempering air.

Still another object of the invention is to utilize in a device as described means responsive to a predetermined high temperature value to provide for a flow of aspirating, tempering air irrespective of the indicating positions of main thermal sensing means, it being a feature of the invention to provide safety mechanism as described which can conveniently be reset for reuse.

A still further object of the invention is to obviate overheating of the system in the event of failure of main thermal sensing means.

Other objects and structural details of the invention will appear from the following description, when read in connection with the accompanying drawings wherein:

FIG. 1 is a view in longitudinal section, a fragment being shown in side elevation, of a mixing valve in accordance with the illustrated embodiment of the invention;

FIG. 2 is a view in end elevation, partly broken away, of the valve of FIG. 1; and FIG. 3 is a detail view showing a fragment of the mixing valve duct and taken substantially as indicated by the line 3—3 of FIG. 2.

Referring to the drawings, in the illustrated embodiment, the invention is disclosed in a valve adapted for aircraft use, the heated fluid being engine bleed air and the aspirated, temperature modifying fluid being ambient air. As shown, the valve device comprises a duct 10 generally tubular in shape and providing oppositely disposed inlet and outlet ends 11 and 12. The latter is open. Installed in the former is a closure device 13 providing a mounting for a nozzle assembly 14. Assembly 14 comprises a fitting portion 15 projecting away from closure 13 outwardly of the duct, and further comprises a flared nozzle portion 16 projecting inwardly in the duct toward exit end 12. Nozzle assembly 14 receives high temperature bleed air from the engine, the fitting portion 15 being adapted to be connected to one end of a hose line or the like extending from the engine. Nozzle portion 16 is disposed to direct or to discharge the high temperature air, which is supplied to the valve under pressure, in a stream flowing axially toward exit end 12. Intermediate its ends the duct 10 has a necked-down section 17 connected to the entrance end of the duct by sloping wall 18 and connected to the exit by a similar sloping wall 19. The arrangement is one to give the duct a venturi configuration in advance of or beyond nozzle 16. A lateral port 21 in the duct 10 is located adjacent to the end of nozzle 16 and has an open boss 22 mounted in an enclosing relation thereto. The outer end of boss 22 is open to the ambient surroundings of the mixing valve. The arrangement accordingly is one in which pressure fluid directed by nozzle assembly 14 to and through the duct 10 aspirates a secondary flow of ambient air through lateral port 21, the two fluids mixing within the duct and being discharged therefrom at exit end 12. The primary pressure fluid, as supplied to nozzle assembly 14, being high temperature air, and the secondary fluid supplied through boss 22 being relatively cooler ambient air, the result is to exert a tempering or temperature modifying effect upon the heated air so that the discharged mixture will be in a desired range of suitable temperatures. According to a feature of the invention the temperature of the discharged mixture is continuously sensed and corresponding adjustments made in the permitted inflow of the secondary fluid with the view of maintaining the discharged mixture at a predetermined temperature value or in a selected range of values.

Controlling admission of the secondary or ambient air flow is a butterfly valve 23 mounted in the duct 22 on a transverse shaft 24 therein. In response to rocking motion of the shaft 24, the valve 23 assumes varying angular positions within boss 22 and as a consequence opens up more or less of the boss to inflow of the ambient air. Disposed as indicated in FIG. 1, wherein the valve is at right angles to the longitudinal axis of boss 22, the valve is in a fully closed position. It is continuously urged from such position by a tension spring 25 anchored to the boss near its outer end. Under the urging of spring 25, the valve 23 tends normally to assume a position more nearly parallel to the longitudinal axis of the boss 22, which position opens the boss to a maximum extent and so becomes the fully open position of the valve.

Temperature sensing means is disposed in the duct down stream of or beyond the venturi configuration therein. In the illustrated instance the temperature sensing means is a power type thermostat developing and exerting thrust pressures of substantial magnitude in response to rising temperature. As shown, the thermostat 26 is one of known structural operating characteristics. Thus it comprises an elongated case 27 containing a material having the property of expansion under applied heat. Extending from case 27 is a body portion 28 while reciprocably disposed in the latter is a plunger 29 adapted to project through and beyond body 28 in response to expansion of the material in case 27. In accordance with its present installation, the thermostat 26 is disposed within a lateral opening in duct 10 in such manner that case 27 projects radially within the duct while body portion 28 and plunger 29 project outside the duct. The body 28 passes through a collar 31 and is received in a cap 32. Elements 31 and 32, along with a pad 33, are bolted or otherwise secured into an integrated assembly which is, by brazing or the like, secured in place in the wall of duct 10. The body 28 is threaded and a nut 34 thereon draws the thermostat downward to a seat on collar 31, the collar and thermostat case 27 having complementary flanges for this purpose.

The thermostat plunger 29 projects outwardly of body 28 and has a bracket 35 secured thereto mounting a pulley reel 36. At the bottom of cap 32 is another bracket 37 and pulley wheel 38. Still another pulley wheel 39 is mounted on a lever arm 41 pivotally mounted on a shaft 42 installed radially in the wall of duct 10. A flexible cord or cable 43 is anchored at its one end in the bottom of cap 32 and passes in a circuitous fashion as indicated over the pulley wheels 36, 38 and 39, extending therefrom toward the boss 22 where the opposite end thereof is connected to a stud 44 on an arm 45 fixed to the shaft 24.

The cap 32 serves as a housing for a compression spring 46 based in the bottom of the cap. At its opposite end the spring 46 engages the turned over edge of a retainer 47 which is in embracing and limiting relation to a flange 48 on the U-shaped bracket 45. The spring 46 tends to effect a return or retracting motion of the plunger 29, as may be allowed by a cooling of the material in case 27, and, being relatively stronger than valve spring 25, tends also to pull the cable 43 in a direction to close valve 23 and tension spring 25 as indicated. In response to a rising fluid temperature in the duct 10, the plunger 29 extends, compressing spring 46 and allowing spring 25 to take up resulting slack in the cable 43 with a consequent corresponding motion of valve 23 toward open position. In response to a lowering fluid temperature, the spring 46 is permitted to return plunger 29 inward, and, in the process, adjust valve 23 toward closed position. Accordingly, a rising fluid temperature in the duct is accompanied by an adjustment of valve 23 to admit a greater flow of cooling air in the duct. Similarly, a falling fluid temperature initiates a proportioned closing motion of valve 23 to reduce the flow of cooling air. The arrangement is one to maintain the fluid discharge at the exit end 12 of duct 10 at a predetermined temperature value or in a selected narrow range of temperatures.

The aforementioned lever 41, mounting pulley wheel 39, is a part of a safety control obviating overheating of the system as might be caused by a failure of the thermostate 26 properly to function. The shaft 42, on which lever 41 is pivotally mounted, passes through a bracket 49 mounted to the shell 10 in superposed relation to an opening 51 therein. A bushing 52 is installed in opening 51 to project radially within duct 10. The inner end of bushing 52 is closed, the bushing providing a bore approximately complementary in its cross-sectional shape to the shaft 42. Within such bore is a eutectic solder or like material which when solid locks the shaft 42 to the housing but which when in a liquid state releases the shaft for relative rotation in the housing. The material is selected with a view to providing a melting temperature therefor corresponding to a predetermined high fluid temperature within duct 10. Thus, the shaft 42 will under normal conditions remain fixed in the housing 52, but, when a predetermined high temperature is reached, as for example when the operating temperature normally established by the thermostat 26 is exceeded, the material holding shaft 42 against rotation melts. Now the shaft is free to rotate.

The lever 41 has shaft 42 passed therethrough intermediate its ends. The pulley wheel 39, protected by a cover 53, is mounted on one end of the lever. On the other end is mounted a pawl 54 engaging teeth on a ratchet 55 fixed to the outer end of shaft 42. By reason of the interengagement of pawl 54 and ratchet 55, the lever 41 normally is prevented from moving from a position substantially as shown in FIG. 1 where it aids in maintaining a taut condition of cable 43 and a tensioning of spring 25. Should shaft 42 be released for rotation, as described, it will turn under the urging of pawl 54 as transmitted from spring 25 and cable 43, allowing the lever 41 to rock downward or in a clockwise direction as seen in FIG. 1. The result is to introduce a substantial amount of slack into the cable 43, in effect restoring actuation of valve 23 to spring 25 which acts to adjust the valve to a fully opened position. This action takes place irrespective of what may be the indicated position or motion of thermostat 26 and insures a continuing high level supply of cooling air to the duct for mixture with the incoming high temperature air. When the system has cooled, the eutectic material in bushing 52 hardens. Thereupon shaft 42 once again is locked against rotation. The cable mechanism is reset to be returned to control of thermostat 26 by rocking the lever 41 upward or in a counter-clockwise direction substantially to a position as illustrated, in which position it is held by engagement of pawl 54 with the ratchet 55.

What is claimed is:

1. A mixing valve, including a duct, means for flowing a high temperature fluid through said duct, means for admitting a relatively cooler fluid to said duct under an educting influence of said high temperature fluid, said cooler fluid combining with and tempering said high temperature fluid, a thermostat having powered motion under temperature change installed in said duct to sense the temperature of the tempered mixture, said thermostat having a portion outside said duct extensible in response to rising temperatures, spring means retracting said thermostat portion in response to lowering temperatures, a valve adjustable to control the admission of said cooler fluid to said duct, other spring means subordinate in strength to the first said spring means biasing said valve to open position, a cable connecting said extensible portion of said thermostat to said valve, and guides for said cable positioned to maintain said valve closed in a retracted position of said thermostat, extension of said thermostat allowing a proportioned opening motion of said valve.

2. A mixing valve, according to claim 1, characterized by a temperature controlled mounting release for one of said guides, release of said one guide allowing motion of said valve to open position irrespective of extension of said thermostat.

3. A mixing valve, including a duct, means for blowing a heated fluid through said duct, said duct having an opening for eduction into said duct of another temperature modifying fluid, a valve for regulating the admission of said other fluid to said duct, spring means for biasing said valve to an open position, a thermostat having an extending motion in response to fluid temperature change in said duct, other spring means for returning said thermostat in a retracting motion, a cable connection between said thermostat and said valve utilizing retracting motion of said thermostat to close said valve, the first said spring means being subordinate in strength to said other spring means, extending motion of said thermostat tending to form slack in said cable connection allowing said biasing means to move the valve toward an open position, and other means responsive to fluid temperature in said duct for creating slack in said cable connection irrespective of the position of said thermostat.

4. A mixing valve, according to claim 3, characterized in that said other means comprises a movable guide for said cable connection, a pivot shaft therefor extending into said duct, a material liquifying at the predetermined high temperature holding said shaft normally against rotation, and means for setting said movable guide to be latched by said shaft in a position inhibiting formation of slack in said cable connection.

5. A mixing valve, according to claim 4, characterized by a pawl and ratchet connection comprised in said setting means whereby said biasing means applies a continuing pressure to urge said movable guide in a direction to rotate said shaft.

References Cited by the Examiner
UNITED STATES PATENTS

| | | | |
|---|---|---|---|
| 1,191,488 | 7/1916 | Watts. | |
| 1,358,838 | 11/1920 | Fulton | 236—12 X |
| 2,199,975 | 5/1940 | Whitney | 137—77 X |
| 2,397,870 | 4/1946 | Kneass | 236—12 |
| 2,675,707 | 4/1954 | Brown | 126—287.5 X |
| 2,690,874 | 10/1954 | Stubblefield | 236—34 |
| 2,774,343 | 12/1956 | Schaffer et al. | |
| 2,821,343 | 1/1958 | Payne | 236—13 |
| 3,114,505 | 12/1963 | Kennedy | 236—13 |

ALDEN D. STEWART, *Primary Examiner.*